United States Patent [19]

Bock et al.

[11] Patent Number: 4,978,459

[45] Date of Patent: * Dec. 18, 1990

[54] OIL SPILL MICROEMULSION DISPERSANTS

[75] Inventors: Jan Bock, Bridgewater; Gerard P. Canevari, Cranford; Max L. Robbins, South Orange, all of N.J.

[73] Assignee: Exxon Research and Engineering Company, Florham Park, N.J.

[ * ] Notice: The portion of the term of this patent subsequent to Aug. 16, 2005 has been disclaimed.

[21] Appl. No.: 305,139

[22] Filed: Feb. 2, 1989

Related U.S. Application Data

[63] Continuation-in-part of Ser. No. 177,406, Apr. 4, 1988, abandoned, which is a continuation-in-part of Ser. No. 50, Jan. 2, 1987, Pat. No. 4,764,285, which is a continuation-in-part of Ser. No. 613,716, May 24, 1984, abandoned.

[51] Int. Cl.$^5$ .............................................. E02B 15/04
[52] U.S. Cl. .................................... 210/749; 210/925; 252/312; 252/353; 252/354; 252/355; 252/358
[58] Field of Search ................ 210/749, 925; 252/312, 252/353, 354, 355, 356, 358

[56] References Cited

U.S. PATENT DOCUMENTS 3,793,218  2/1974  Canevari ............................ 252/354
3,998,733  12/1976  Blanchard et al. ................. 210/925
4,146,499  3/1979  Rosano ................. 252/312
4,252,657  2/1981  Barriol et al. ........................ 252/312
4,469,603  9/1984  Lepain et al. ........................ 210/749
4,472,291  9/1984  Rosano ................. 252/312
4,502,962  3/1985  Becker et al. ........................ 210/925
4,597,893  7/1986  Byford et al. ........................ 210/925
4,764,285  8/1988  Robbins ............................ 210/749

Primary Examiner—Peter Hruskoci
Attorney, Agent, or Firm—Richard E. Nanfeldt

[57] ABSTRACT

A method for dispersing an oil spill on sea water, which method comprises applying to the oil spill surface an effective amount of: (i) a blend of one or more hydrophilic and one or more lipophilic surfactants so balanced that they will form microemulsions with the sea water and the oil to be dispersed; (ii) a solvent which is miscible with the oil to be dispersed and in which the blend of surfactants is substantially soluble; and (iii) from 0 to about 10 weight percent water, wherein the blend of surfactants is such that it lowers the interfacial tension between the oil to be dispersed and the sea water to less than about 250 mdynes/cm when the blend is used at a treat rate of less than about 1 to 100 by weight, based on the oil to be dispersed, wherein the solvent is a hydrocarbon solvent selected from the group consisting of No. 2 diesel fuel oil, kerosene and white oil.

3 Claims, No Drawings

OIL SPILL MICROEMULSION DISPERSANTS

This is a continuation-in-part application of U.S. Ser. No. 177,406, filed Apr. 4, 1988 which in turn is a Continuation-in-Part Application of U.S. Ser. No. 000,050, filed Jan. 2, 1987, now U.S. Pat. No. 4,764,285 which is a Continuation-in-Part Application of U.S. Serial No. 613,716, filed May 24, 1984, now abandoned.

FIELD OF THE INVENTION

The present invention relates to the preparation of novel surfactant blends and their use for dispersing oil spills.

BACKGROUND OF THE INVENTION

Accidental discharges of oil close to shore can have serious detrimental effects on the environment. Consequently, it is desirable to treat the discharge so that rapid dispersion of oil into the sea water is accomplished This requires that the dispersant penetrate the oil film and rapidly spread at the oil/water interface, thereby sharply lowering the oil/water interfacial tension. For good dispersion at the relatively low shear supplied by wave motion, ultra-low interfacial tensions are required The design of a good oil spill dispersant involves blending surfactants to achieve such low interfacial tensions at very low surfactant-to-oil treat rates, generally in the range of 1/100 to 1/500 by weight. The requirement that the dispersant mixture be effective at such low concentrations establishes a low probability of success of empirically selecting the correct combination of surfactants. Consequently, there is a need in the art for surfactant systems suitable for economically dispersing oil-spills.

This invention is an improvement over compositions of oil spill dispersants disclosed in patent application U.S. Ser. No. 613,716. Improved oil spill dispersants based on microemulsion technology consist of mixtures of ethoxylated alkyl ammonium alkylaryl sulfonates with ethoxylated non-ionic surfactants, e.g., Tween 80. The surfactant ratio is so adjusted that lower phase microemulsions form with an isoparaffinic oil, such as Isopar M, and sea water, preferably near the transition boundary between lower and middle phase microemulsions. Surfactant H/L ratio is further adjusted to accommodate crude oil composition and ambient conditions.

The compositions disclosed herewith have improved oil dispersion efficiency, lower viscosity for ease of application and reduced toxicity to fish.

SUMMARY OF THE INVENTION

In accordance with the present invention, there is provided a method for dispersing an oil spill on sea water, which method comprises applying to the oil spill surface an effective amount of: (i) a blend of one or more hydrophilic and one or more lipophilic surfactants whose ratio is so adjusted that they will form microemulsions with the sea water and the oil to be dispersed; (ii) a solvent which is miscible with the oil to be dispersed and in which the blend of surfactants is substantially soluble; and (iii) from 0 to about 10 weight percent water. The blend of surfactants is such that it lowers the interfacial tension between the oil to be dispersed and the sea water to less than about 250 mdynes/cm when the blend is used at a treat rate of less than about 1 to 100 by weight, based on the weight of the oil to be dispersed.

In preferred embodiments of the present invention, the surfactant ratio in the blend is adjusted so that it is either at Balance or on the hydrophilic side of Balance. The term "Balance" is defined by a set of operations and properties disclosed in the Detailed Description of the Invention to follow.

In other preferred embodiments of the present invention, the blend of surfactants is comprised of two or more surfactants selected from one or both of:

(a) an ethoxylated alkylammonium alkylaryl sulfonate or an ethoxylated alkylammonium alkyl sulfonate selected from the group consisting of the formula:

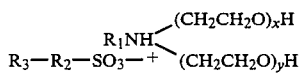

where $R_1$ and $R_3$ are alkyl groups containing 8 to 24 carbon atoms and $R_2$ is an aryl or 1 or 2 methyl substituted aryl; and $x+y=2$ to 20.

(b) an ethoxylated nonionic surfactant of the formula:

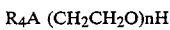

where $R_4$ is an alkyl or mono- or di-alkyl aryl group containing 8 to 30 carbon atoms,

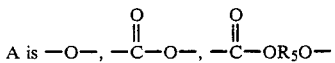

$R_5$ is a poly hydroxyl group derived from glycerol, glycols, sorbitol or various sugars; and n is an integer from 1 to 30.

DETAILED DESCRIPTION OF THE INVENTION

In the practice of the present invention, at least two or more surfactants are selected and balanced with respect to their combined hydrophilic and lipophilic properties such that they cause an interfacial tension (hereinafter sometimes referred to as IFT) of less than about 250 mdynes/cm at the oil/sea water interface.

Preferably, the blend of surfactants used herein is such that the weight of the hydrophilic portion to the lipophilic portion is adjusted so that when equal volumes of the oil and sea water are mixed with 1.5 gm surfactant blend per 100 ml of oil and sea water, the resulting mixture separates on standing to form a middle microemulsion phase containing equal volumes of sea water and oil in equilibrium with equal volumes of excess oil and sea water. Such a microemulsion is said to be at Balance. The larger the volume of microemulsion phase at Balance, the greater the reduction in IFT between the oil and the sea water and the more effective the surfactant blend is as an oil spill dispersant. The microemulsion phase should preferably occupy at least 20% of the total volume.

Although the surfactants selected for Balance are effective oil spill dispersants, best results are obtained when the surfactant blend is on the hydrophilic side of Balance. That is, if the ratio of hydrophilic surfactants to lipophilic surfactants is increased sufficiently beyond that required for Balance, a lower phase microemulsion will form. The term "lower phase microemulsion" is defined below by a set of operations and properties. Such surfactant blends, in an appropriate solvent, are more preferred as oil spill dispersants as long as they are still capable of lowering the IFT between the oil and sea water to less than about 250 mdynes/cm when the blend is used at a treat rate of less than about 1 to 100 by weight, based on the weight of oil to be dispersed.

The hydrophile for purposes of this invention is defined as a surfactant having the properties of providing, at 1.5 weight percent concentration in equal volumes of the oil and sea water, a lower phase microemulsion at 20° C. and provides to said sea water an interfacial tension less than about 0 5 dynes/cm, preferably less than about 0.2 dynes/cm when measured against said oil at 20° C. The term "lower phase" microemulsion is descriptive in context since it means that the aforementioned system consisting of the hydrophilic surfactant and equal volumes of oil and sea water separates into an aqueous lower phase containing most of the surfactant in equilibrium with an excess oil phase which is essentially surfactant-free.

The hydrophile which is defined by the above properties is an ethoxylated alkyl ammonium-alkylaryl sulfonate or an ethoxylated alkylammonium-alkyl sulfonate selected from the group consisting of having the formula:

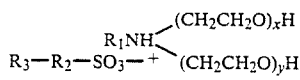

where $R_1$ and $R_3$ are alkyl groups containing 8 to 24 carbon atoms and $R_2$ is an aryl or 1 or 2 methyl substituted aryl; and $x+y=2$ to 20.

Representative samples of the ethoxylated ammonium alkylaryl sulfonate include ethoxylated $C_{12}$-$C_{18}$ alkyl ammonium salts of $C_9$-$C_{24}$ alkyl and alkylaryl sulfonic acids containing 6 or more ethylene oxide (hereinafter EO) groups, wherein the alkyl and aryl sulfonate groups include dodecyl o-xylene sulfonate, dodecyl benzene sulfonate, tetradecyl benzene sulfonate, hexadecyl benzene sulfonate, and dodecyl naphthalene sulfonate. Preferred hydrophilic sulfonic acid salts include heptaethoxy octadecyl ammonium dodecyl o-xylene sulfonate (designed $C_{12}$XS-Et7) and decaethoxy octadecyl ammonium dodecyl ortho xylene sulfonate (designated $C_{12}$XS-Et10). The ethoxylated alkyl amines used in preparing the ethyoxylated alkyl ammonium salts of alkyl aryl sulfonic acid can be obtained from Akzo Chemie America under the trade name Ethomeens ®.

The lipophile, for purposes of this invention, is a surfactant having the properties of providing at 1.5 weight percent concentration in equal volumes of oil and sea water an upper phase microemulsion at 20° C. and provides to said oil an interfacial tension of less than 0.5, preferably less than 0.2 dynes/cm when measured against said sea water at 20° C. The term "upper phase" microemulsion as used in defining the lipophilic surfactant ingredient means that the system consisting of the surfactant in equal volumes of oil and sea water separates into a surfactant-containing oil upper phase in equilibrium with an excess aqueous phase which is essentially surfactant-free.

The lipophile having been defined by the above properties includes, but is not limited to, the ethoxylated $C_{12}$-$C_{18}$ alkyl ammonium salts of $C_9$-$C_{24}$ alkyl and alkyl/aryl sulfonic acids containing less than six EO groups, wherein the alkyl and aryl groups are as previously defined above.

The ethoxylated nonionic surfactant of the formula:

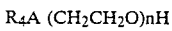

where $R_4$ is an alkyl or mono- or di-alkyl aryl group containing 8 to 30 carbon atoms,

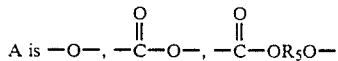

$R_5$ is a poly hydroxyl group derived from glycerol, glycols, sorbitol or various sugars; and n is an integer from 1 to 30.

Representative examples of ethoxylated non-ionic surfactants include polyoxethylene sorbitan mono oleate (Tween 80 ® from ICI), polyoxethylene sorbitan monolaurate (Tween 20 ®), polyoxethylene sorbitan trioleate (Tween 85 ®), sorbitan monolaurate (Span 20 ®), sorbitan monooleate (Span 80 ®), polyoxethylene lauryl alcohol (Brij 30 ®), polyoxethylene oleyl alcohol (Brij 92 ®) and sorbitan fatty acid esters.

A hydrocarbon liquid (oil) acts as a solvent for the blend of surfactants and enters into a microemulsion with sea water. The hydrocarbon liquid, which may be comprised of one or more hydrocarbon oils, is selected such that (1) they are miscible with the oil to be dispersed; and (2) the surfactants are soluble in, or miscible with the hydrocarbon liquid, which hydrocarbon liquid may also contain water. For example, it may be beneficial to add (up to about 10 weight percent) water to improve the solubility of the surfactants in the hydrocarbon oil. Non-limiting examples of hydrocarbons suitable for use include Isopar ® M, No. 2 diesel fuel oil, kerosene, naphthas, white oil and the like. The hydrocarbon oil is used in an effective amount, that is, an amount such that the viscosity of the blend of surfactants and hydrocarbon oil is such that it is suitable for delivery by the chosen technique, preferably spraying. The effective amount, of course, will vary depending upon the technique used to apply the surfactant blend to the oil spill. This can be determined by one having ordinary skill in the art.

Under certain circumstances, up to 50, generally 10 to 25, weight percent of a cosolvent is included in the solvent to improve the solubility and reduce the viscosity of the surfactant in the hydrocarbon medium. The cosolvents are of the class of alkylene glycol monoalkyl ethers, $C_2$ to $C_5$ alkanols and mixtures thereof. Representative cosolvents include ethers such as ethylene glycol monopropyl ether, ethylene glycol monoethyl ether, ethylene glycol monomethyl ether, ethylene glycol monobutyl ether, diethylene glycol monomethyl ether, diethylene glycol monoethyl ether, diethylene glycol n-butyl ether, propylene glycol monomethyl ether, dipropylene glycol monomethyl ether and tripropylene glycol monomethyl ether, and alkanols which include straight and branched chain members, such as ethanol, propanol, butanol and pentanol. Of the alkanols, tertiary amyl alcohol (TAA) is preferred. Of the ethers, ethylene glycol monobutyl ether is preferred. It is understood, where appropriate, some of the above cosolvents can be used in place of the hydrocarbon solvent. Non-limiting examples of the more preferred cosolvents which can be used in place of the hydrocarbon solvent include ethylene glycol monobutyl ether, ethylene glycol monoethyl ether, diethylene glycol monoethyl ether and diethylene glycol monobutyl ether.

It is understood that when using a cosolvent the ratio of the surfactants may have to be readjusted for changes in phase behavior brought about by the addition of the cosolvent.

The surfactant blend in a solvent of the present invention is preferably designed so that its density is greater than the oil to be dispersed, but less than the sea water. Water itself may be used to adjust the density and/or the viscosity of the system, which will result in an emulsion or microemulsion, thereby improving delivery so that the surfactants sink to the oil-sea water interface in a relatively short period of time. The surfactant system is also such that once it gets to the oil-sea water interface it lowers the oil-sea water interfacial tension below about 250, preferably below about 200, more preferably below about 100 mdynes/cm so that wave motion can easily disperse the oil.

In the practice of the present invention the surfactant system is applied to the oil spill by any suitable means, such as spraying. Enough of the surfactant blend is applied such that the treat rate is less than about 1 to 100, preferably less than about 1 to 200, and more preferably less than about 1 to 500 by weight of the surfactant blend, based on the oil to be dispersed, while maintaining the IFT at the oil-sea water interface below about 250 mdynes/cm.

The following Examples serve to more fully describe the manner of practicing the above-described invention. It is to be understood that these Examples in no way serve to limit the true scope of this invention, but, rather, are presented for illustrative purposes.

Dispersion tests were run as follows. A standard 8 oz. wide mouth jar is filled with 6 oz. of sea water. A quantity, 2.5ml of crude oil, is gently applied to the surface of the water. At this point, 0.08 ml. of the test dispersant is added dropwise to the oil film. Agitation is then applied with a steel spoon-type spatula by moving the spatula from one side of the jar to the other in a straight line. The time to make one 37 round trip" is 1 second. This is repeated six times for a six second duration of gentle mixing. The dispersant effectiveness is then rated visually on a scale of 1 to 10; 10=excellent dispersion, and 1=very poor dispersion.

EXAMPLES 1-4

Microemulsion Based Surfactants as Dispersants

A series of surfactant blends were developed based on a hydrophile and lipophile surfactant. The lipophile, designated as $C_{12}XS$-Et5 was composed of a salt of octadecyl ethoxy amine with five moles of ethylene oxide and dodecyl o-xylene sulfonate. The hydrophile was a salt of octadecyl ethoxy amine with either 7 or 10 moles of ethylene oxide and dodecyl o-xylene sulfonate. These were designated as $C_{12}XS$-Et7 and $C_{12}XS$-Et10 respectively. Blending these surfactants in the ratios shown in Table 1, Examples 1-4, with equal amount of sea water and Isopar M resulted in either a middle phase (m) or a lower phase (l) microemulsion. The balanced middle phase provided information on surfactant efficiency in terms of uptake. This is defined as the volume of oil or water solubilized per volume of surfactant and the values are shown in Table 1. The dispersancy test previously described was used to assess the performance of these surfactant blends for dispersing Kuwait crude into sea water. As indicated by the performance of the dispersants of Examples 1-4 in Table 1, these blends provided good dispersancy. The systems illustrated in these examples are representative of those described in copending application U.S. Ser. No. 839,547.

EXAMPLES 5-10

Improved Oil Spill Dispersants

The addition of a nonionic surfactant to the surfactants used in the dispersant blends described in Examples 1-4 provides oil spill dispersants with surprisingly improved efficiency. This is illustrated by Examples 5-9 in Table 1 which exhibit similar uptake in the microemulsion but improved dispersion of Kuwait crude on sea water. Tween 80 is a sorbitan monooleate ethoxylated with 20 ethylene oxide groups.

Examples 5-10 in Table 1 illustrates the role of microemulsion phase behavior on dispersancy of two crudes, Kuwait and Murban. As the data indicates, surfactant blends which yield lower to middle phase microemulsions with equal volumes of Isopar M and Sea water provide the best dispersancy with the two crudes evaluated. When the surfactant composition yields upper phase microemulsions as in Example 10, the resultant dispersancy is significantly worse. Thus, designing the dispersant to yield microemulsions close to middle phase bbut on the hydrophilic side of balance yields the most preferred compositions.

TABLE I

EIGHT OZ. JAR DISPERSANCY TEST RESULTS

| Example | $C_{12}XS$-Et5 | $C_{12}XS$-Et7 | $C_{12}XS$-Et10 | TW80 | M.E. Type | Dispersancy Uptake | Dispersancy Kuwait |
|---|---|---|---|---|---|---|---|
| 1 | 0.335 | 0.665 | — | | m | 14.5 | 5 |
| 2 | .200 | .800 | — | | l | — | 6.5 |
| 3 | .525 | — | 0.475 | | m | 14.5 | 6.5 |
| 4 | .415 | — | .585 | | l | — | 7 |
| 5 | .540 | — | .310 | .150 | m | 13.8 | 9 |
| 6 | .476 | — | .274 | .250 | l | — | — |
| 7 | .580 | — | .220 | .200 | m | 14.8 | 9 |
| 8 | .507 | — | .193 | .300 | l | — | 7.5 |
| 9 | .595 | — | .105 | .300 | l | — | 8 |
| 10 | .700 | — | — | .300 | u | — | 6 |

EXAMPLE 11

Dispersants with Improved Fish Toxicity

A series of tests were performed using the dispersants of Examples 2, 6 and 8 to determine toxicity of these compositions to marine life. The concentration of the dispersant in ppm required to kill 50% of the fish in 24 hrs. (LC$_{50}$) was determined using fundulus heteroclitus in water containing 25 ppt salinity. The data in Table 2 compare the toxicity of these oil spill dispersants with each other and a commercial dispersant.

Dispersants of Examples 6 and 8 containing the nonionic surfactant exhibit improved dispersancy and reduced fish toxicity relative to that of Example 2 or the commercial dispersant.

TABLE II

DISPERSANT TOXICITY

| Dispersant | 24 hr $LC_{50}$ (ppm) |
|---|---|
| Example 2 | 26 |
| Example 6 | 132 |
| Example 8 | 194 |
| Commercial Dispersant | 130 |

EXAMPLE 12

Microemulsion-Based Dispersants are More Effective Than Commercial Dispersants; Dispersion Efficiency Persists with Time A 1,000 ml. volumetric flask was filled to the neck of the vessel with sea water. Ten ml. of crude oil was then added and a measuring label affixed to the neck of the flask so that the amount of oil could be measured One ml. of the dispersant is then pipetted onto the oil. After a 1 minute contact time, the flask is rotated 140° and held in that upside-down position until liquid displaces the air in the top of the flask. This gentle rotation is repeated 10 times. The amount of oil returning to the neck of the flask (no longer dispersed in the bulk of the water) is then measured versus time.

| | % Murban Dispersed | |
|---|---|---|
| Time (Minutes) | Example 9 | Commercial Dispersant |
| 1 | 99 | 95 |
| 5 | 96 | 75 |
| 8 | 93 | 69 |
| 10 | 93 | 58 |
| 15 | 93 | 43 |
| 20 | 93 | 29 |
| 30 | 93 | 23 |

As indicated, the composition of this invention illustrated by Example 9 provides improved dispersion relative to one of the best commercial dispersants. The improvement in dispersion of Murban crude into sea water is maintained for much longer times with these new dispersants. This will provide additional time for the natural biological forces to attach and remove the oil preventing reformation of the slick.

EXAMPLE 13

Addition of Isopropanol to Microemulsion-Based Dispersant Lowers Viscosity for Ease of Application at Low Temperatures The surfactant blend from Example 8 was chosen for further field testing and evaluation. To reduce the viscosity of the dispersant blend for ease of application, a portion of the Isopar M was replaced by isopropanol (IPA). As the data below shows, 15% IPA brings the final viscosity within the target of 100 cP.

| | Brookfield Vis. (cp)[1] of CRX-8[2] Containing Isopropanol/Isopar M at Ratio = | | | | | | |
|---|---|---|---|---|---|---|---|
| Temp. °C. | 0/50 | 5/45 | 10/40 | 15/35[3] | 20/30 | 25/25 | Target |
| 0 | >400 | — | 147 | 100 | 84 | 76 | <100 |
| 25 | 165 | 108 | 70 | 58 | 22.5 | 22 | <100 |

[1] At 1.83 $sec^{-1}$; N.B. Fluids are Newtonian from 0.36 to 3.67 $sec^{-1}$
[2] 50 Weight % Surfactants
[3] Designated CRX-8A

EXAMPLE 14

Large Scale Testing Shows Microemulsion-Based Dispersants are More Effective Than Commercial Dispersant at Low Temperature (2° C.) and at Long Times The data for this example was developed in a wave tank at Calgary This is an outdoor concrete basin 54.5 meters long by 30.8 meters wide, with a bottom profile of variable depth, increasing from 1.85 meters at the shallow (east) end to 3.3 meters at the deep (west) end. With the water level approximately 0.75 from the top of the basin in order to accommodate the waves, the water depth ranged from 1.1 meters to 2.54 meters. The wave generator was situated in the deep end against the west wall of the basin. Ten and 20 cm waves were generated for the test.

For the tests conducted, the oil was applied to the surface of the water inside a circular containment boom. The boom consisted of a floating ring (diameter 10 m) encased in heavy plastic which hung 1.8 m into the water to form a cylindrical skirt ballasted on the bottom with an encased heavy steel chain. The boom was anchored in place in the deep end of the basin (about 6 m from the wave generator). In order to simulate an ocean environment, sodium chloride was added to the basin to produce a salinity of about 28 parts per thousand, which is typical of the surface salinity in regions of the Beaufort Sea in August and September.

Seventy-five liters of Alberta Sweet Mixed Blend crude oil wire released inside the boomed area to provide a representative slick thickness. The chemical dispersant was then applied by means of a spray boom that was driven over the boomed oil area at a rate to apply the appropriate amount of dispersant.

During the test, water samples were collected at 50, 100 and 150 cm depths from two stations inside the boom One station was in the center of the boom. The water from all three levels of this manifold [was pumped through on-line fluorometers for continuous measurement of oil content. A second manifold f[r sampling at the three depths was located near the periphery of the boom to check concentration of oil in the water column in the event the oil slick was more concentrated at this point rather that at the center. The water sample from the top sample tap (50 cm below the water surface) of this manifold was pumped through a fourth on-line fluorometer. One gallon samples were also collected for subsequent analysis as a check on the fluorometer readings. Samples were collected at 5, 10, 15, 30, 60, 120 and 180 minutes after application of the dispersant.

The following runs were conducted during the test interval. For all tests, 75 liters of Alberta Sweet Mixed Blend crude oil were released at 5.57 liters of dispersant were applied. This represents 3.75 liters of dispersant actually contacting the oil for a 20:1 oil:dispersant treat rate.

| Depth | Sample | Peak Dispersion Time (Hrs) | PPM | Steady PPM |
|---|---|---|---|---|
| 50 cm | Fresh Oil | — | <1 | <1 |
| | Aged Oil | — | 3 | 2 |
| | Commercial Dispersant | 0.6 | 25 | 8 |
| | CRX-8A | 0.4 | 55 | 13 |
| 150 cm | Fresh | — | 0 | 0 |
| | Aged Oil | — | 2 | 1 |
| | Commercial Dispersant | 0.6 | 28 | 7 |
| | CRX-8A | 0.5 | 25 | 12 |

What is claimed is:

1. A method for dispersing an oil spill on sea water, which method comprises applying to the oil spill surface an effective amount of: (i) a blend of one or more hydrophilic and one or more lipophilic surfactants so balanced that they will form microemulsions with the sea water and the oil to be dispersed; (ii) a solvent which is miscible with the oil to be dispersed and in which the blend of surfactants is substantially soluble; and (iii) from 0 to about 10 weight percent water, wherein the blend of surfactants is such that it lowers the interfacial tension between the oil to be dispersed and the sea water to less than about 250 mdynes/cm when the blend is used at a treat rate of less than about 1 to 100 by weight, based on the oil to be dispersed, wherein the solvent is a hydrocarbon solvent selected from the group consisting of No. 2 diesel fuel oil, kerosene and white oil, wherein the blend of surfactants is comprised of two or more surfactants selected from:

(a) an ethoxylated alkyl or alkanol ammonium salt of n alkyl or alkyl/aryl sulfonate of the formula:

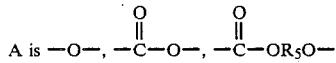

where $R_1$ and $R_3$ are alkyl groups containing 8 to 24 carbon atoms and $R_2$ is an aryl or 1 or 2 methyl substituted aryl; and $x+y=2$ to 20.

(b) an ethoxylated nonionic surfactant of the formula:

$$R_4A\ (CH_2CH_2O)nH$$

where $R_4$ is an alkyl or mono- or di-alkyl aryl group containing 8 to 30 carbon atoms, $$A \text{ is } -O-,\ -\overset{O}{\underset{\|}{C}}-O-,\ -\overset{O}{\underset{\|}{C}}-OR_5O-$$

$R_5$ is a poly hydroxyl group derived from glycerol, glycols, sorbitol or various sugars; and n is an integer from 1 to 30.

2. The method of claim 1 wherein a cosolvent is present and the cosolvent is selected from the group consisting of one or more alkylene glycol monoalkyl ethers and $C_2$ to $C_5$ alcohols.

3. The method of claim 2 wherein the cosolvent is isopropyl alcohol and is present in the range of about 10 to about 50 weight percent based on the total weight of the solvents employed.

* * * * *